(12) United States Patent
Ueno et al.

(10) Patent No.: US 8,217,098 B2
(45) Date of Patent: Jul. 10, 2012

(54) THERMOSETTING RESIN COMPOSITION HAVING RUBBERY POLYMER PARTICLE DISPERSED THEREIN, AND PROCESS FOR PRODUCTION THEREOF

(75) Inventors: Masakuni Ueno, Takasago (JP); Ryuji Furukawa, Takasago (JP); Shinya Hongou, Takasago (JP); Kazuki Nishiyama, Takasago (JP)

(73) Assignee: Kaneka Corporation, Osaka (JP)

( * ) Notice: Subject to any disclaimer, the term of this patent is extended or adjusted under 35 U.S.C. 154(b) by 84 days.

(21) Appl. No.: 12/449,834

(22) PCT Filed: Jan. 16, 2008

(86) PCT No.: PCT/JP2008/050422
§ 371 (c)(1),
(2), (4) Date: Aug. 28, 2009

(87) PCT Pub. No.: WO2008/105189
PCT Pub. Date: Sep. 4, 2008

(65) Prior Publication Data
US 2010/0099800 A1      Apr. 22, 2010

(30) Foreign Application Priority Data
Feb. 28, 2007   (JP) ................................ 2007-048295

(51) Int. Cl.
*C08L 21/02* (2006.01)
*C08L 51/04* (2006.01)
*C08L 61/10* (2006.01)
*C08J 3/11* (2006.01)

(52) U.S. Cl. ............... 523/413; 525/63; 525/65; 525/68; 525/69

(58) Field of Classification Search ................. 523/413; 525/63, 65, 68, 69
See application file for complete search history.

(56) References Cited

U.S. PATENT DOCUMENTS

| | | | |
|---|---|---|---|
| 3,322,852 A | 5/1967 | Trementozzi et al. | |
| 3,496,250 A | 2/1970 | Czerwinski | |
| 3,975,322 A * | 8/1976 | Reinshagen et al. | 523/458 |
| 4,565,853 A | 1/1986 | Herscovici et al. | |
| 4,695,598 A * | 9/1987 | Yamamoto et al. | 523/400 |
| 4,778,851 A | 10/1988 | Henton et al. | |
| 5,426,150 A * | 6/1995 | Eldin et al. | 525/65 |
| 6,444,272 B1* | 9/2002 | Matsuda et al. | 427/410 |
| 7,374,278 B2 | 5/2008 | Ando et al. | |
| 7,485,680 B2 | 2/2009 | Furukawa et al. | |
| 2003/0114588 A1 | 6/2003 | Nakamura et al. | |
| 2003/0199613 A1 | 10/2003 | Ninomiya et al. | |
| 2003/0199628 A1 | 10/2003 | Weese et al. | |
| 2004/0087681 A1 | 5/2004 | Shah | |
| 2007/0027233 A1 | 2/2007 | Yamaguchi et al. | |
| 2007/0027263 A1* | 2/2007 | Furukawa et al. | 525/314 |
| 2010/0099800 A1 | 4/2010 | Ueno et al. | |

FOREIGN PATENT DOCUMENTS

| | | |
|---|---|---|
| CA | 2164915 | 6/1996 |
| CA | 2526461 | 12/2004 |
| JP | 59-138254 | 8/1984 |
| JP | 62-34251 | 7/1987 |
| JP | 8-183836 | 7/1996 |
| JP | 10-287792 | 10/1998 |
| JP | 2000-256568 | 9/2000 |
| JP | 2000-265038 | 9/2000 |
| JP | 2000-313818 | 11/2000 |
| JP | 2004-18803 | 1/2004 |
| JP | 2004-315572 | 11/2004 |
| JP | 2005-248109 | 9/2005 |
| JP | 2005-255822 | 9/2005 |
| JP | 2006-45292 | 2/2006 |
| WO | 2004/108825 | 12/2004 |
| WO | 2005/028546 | 3/2005 |

OTHER PUBLICATIONS

Yamaguchi et al., electronic translation of JP 2005-255822, Sep. 2005.*
International Search Report dated Apr. 8, 2008 in International (PCT) Application No. PCT/JP2008/050422, filed Jan. 16, 2008.
Office Action issued Jan. 19, 2011 in related U.S. Appl. No. 11/660,274.
Advisory Action issued Nov. 2, 2009 in related U.S. Appl. No. 11/660,274.
Office Action issued Jul. 23, 2009 in related U.S. Appl. No. 11/660,274. Office Action issued Jun. 2, 2011 in related U.S. Appl. No. 11/660,274.
International Preliminary Report on Patentability and Written Opinion of the International Searching Authority issued Mar. 1, 2007 in International (PCT) Application No. PCT/JP2005/014779.
International Search Report issued Nov. 15, 2011 in International (PCT) Application No. PCT/JP2005/014779.
Office Action issued Dec. 29, 2008 in related U.S. Appl. No. 11/660,274.
Advisory Action issued Oct. 19, 2011 in related U.S. Appl. No. 11/660,274.
Canadian Office Action issued Feb. 20, 2012 in corresponding Canadian Application No. 2,577,681.

* cited by examiner

*Primary Examiner* — Jeffrey Mullis
(74) *Attorney, Agent, or Firm* — Wenderoth, Lind & Ponack, L.L.P.

(57) ABSTRACT

A thermosetting resin composition having rubbery polymer particles dispersed therein of the present invention, that does not precipitate the thermosetting resin rubbery polymer particles over a long period of time, has excellent fluidity, is easily cured and molded, and sufficiently exhibits original properties of the thermosetting resin, comprises 100 parts by weight of a thermosetting resin, and 1 to 80 parts by weight of rubbery polymer particles, the rubbery polymer particles being dispersed in the form of a primary particle, wherein the solid content concentration is 60% to 90% by weight, and the water concentration is 3% by weight or less, and can efficiently be produced industrially in the state that the rubbery polymer particles are maintained in a stable state. The composition can be produced by a process for production of a thermosetting resin composition having rubbery polymer particles dispersed therein of the present invention, comprising a concentration step of deaerating a gas phase adjacent to a mixed solution comprising the rubbery polymer particles, the thermosetting resin, water and an organic solvent to reduce the pressure therein, thereby reducing the amounts of the water and the organic solvent in the mixed solution.

8 Claims, No Drawings

THERMOSETTING RESIN COMPOSITION HAVING RUBBERY POLYMER PARTICLE DISPERSED THEREIN, AND PROCESS FOR PRODUCTION THEREOF

TECHNICAL FIELD

The present invention relates to a useful thermosetting resin composition having rubbery polymer particles dispersed therein, and a process for production thereof.

BACKGROUND ART

Cured products of thermosetting resins such as epoxy resins and phenolic resins have many excellent qualities such as dimensional stability, mechanical strength, electrical insulating properties, heat resistance, water resistance and chemical resistance. However, the cured products of those resins have small fracture toughness, and may show very brittle properties. As a result, the properties may have problems in applications of a wide range. As one of methods for solving those problems, it is attempted to compound a nanosize rubber component with reactive organic compound monomers of those resins (for example, see Patent Document 1).

In general, rubbery polymers capable of using as the rubber component are previously prepared in a particle state using, for example, a polymerization method in an aqueous medium, represented by emulsion polymerization, dispersion polymerization or suspension polymerization. The method of compounding the rubber polymer with matrix resins is a method of extracting rubbery polymer particles from the aqueous medium using an organic solvent, dispersing the rubbery polymer particles in the organic solvent, and finally mixing the rubbery polymer particles dispersed in the organic solvent with those resins (for example, see Patent Document 2).

This method involved the problem that because aqueous medium-derived water remains in thermosetting resins having rubbery polymer particles dispersed therein in an amount of about 5% to 10% by weight, curing is liable to be impaired by the influence of residual water in the starting resins when curing at the time of processing the resins, in the field of applications requiring good quality.

To solve this problem, the following methods are known as a method of reducing water concentration in the thermosetting resin solution having the rubbery polymer particles dispersed therein.

(1) Molecular sieve
(2) Pervaporation method using a gas separation membrane
(3) Distillation method Of those methods, a dehydration method of adsorbing water molecules in porous holes of molecular sieves and the like requires a large amount of molecular sieves used to the amount of water to be dehydrated. Furthermore, in the case that polymer particles are present in a material to be dehydrated as in the present invention, its regeneration is not easy, and it is considered that the method is not suitable to industrial utilization.

Furthermore, the pervaporation method using a gas separation membrane is the technology that temperature of a solution containing a polymer located on one side of the gas separation membrane is elevated to the boiling point of water to form a vacuum on other side of the membrane, thereby removing only water molecules permeating fine pores of the membrane from the solution having been contacted with the membrane. However, in the case that the separation membrane is installed in a liquid phase part, when water is removed from a solution containing rubbery polymer particles as in the present invention, the rubbery polymer particles adhere to the membrane surface, and particularly, the fine pores are clogged. As a result, dehydration effect is liable to be decreased, and to ensure sufficient dehydration rate, area of the separation membrane is required to be very large, which is not practical. Furthermore, durability of such the separation membrane is low, and the separation membrane is not suitable for industrial use.

The distillation method is a method of directly removing water. Therefore, water can be removed even from a solution containing rubbery polymer particles as in the present invention without contacting the same with a porous material, a separation membrane and the like, and the method is considered to be most suitable. However, in the case that a general azeotropic solvent such as benzene, n-hexane, toluene or xylene is used, this poses the problem that sufficient investigations are not yet made in whether or not an industrial production process of a high quality thermosetting resin composition having rubbery polymer particles dispersed therein which is the object of the present invention can be achieved, and a high quality composition can be obtained.

Specifically, a process of efficiently reducing water in the state that rubbery polymer particles are maintained in a stably dispersed state is not yet known.

Patent Document 1: Japanese Patent Laid-Open Publication No. 2005-255822
Patent Document 2: WO 2005/028546 pamphlet

DISCLOSURE OF THE INVENTION

Problems to be Solved by the Invention

The present invention provides a process for efficiently reducing water in a stable state of rubbery polymer particles, that is, in a state that dispersion in the form of a primary particle (called primary dispersion or monodispersion) is maintained, without generating scales in reducing water concentration in a solution having rubbery polymer particles dispersed therein in the production of a thermosetting resin composition having rubbery polymer particles dispersed therein.

The present invention further provides a thermosetting resin composition having rubbery polymer particles dispersed therein, in which water concentration is sufficiently low; for example, in the case of an epoxy resin, the content of plastically acting water is small, so that its original qualities are obtained; the rubbery polymer particles do not precipitate by aggregating over a long period of time; and fluidity is excellent. Further preferably, the present invention provides a high quality thermosetting resin composition having rubbery polymer particles dispersed therein, having reduced amount of impurities.

Means for Solving the Problems

As a result of earnest investigations to solve the above problems, the present inventors have found a process for efficiently and industrially producing a thermosetting resin composition having rubbery polymer particles dispersed therein, having sufficiently low water concentration, and have reached to complete the present invention.

That is, the present invention relates to a thermosetting resin composition having rubbery polymer particles dispersed therein, comprising 100 parts by weight of a thermosetting resin, and 1 to 80 parts by weight of rubbery polymer particles, the rubbery polymer particles being dispersed in the form of a primary particle, wherein the solid content concentration of the composition is 60% to 90% by weight, and the water concentration thereof is 3% by weight or less.

The preferred embodiment is that the solid content concentration is 60% to 80% by weight.

The preferred embodiment is the thermosetting resin composition having rubbery polymer particles dispersed therein, wherein the rubbery polymer particle has a core-shell structure comprising at least two layers of a inside rubber particle core, and an outermost shell layer, the inside rubber particle core comprises a rubbery polymer having a glass transition temperature of 0° C. or lower, and the outermost shell layer comprises a shell polymer having a reactive group.

The preferred embodiment is that the thermosetting resin comprises an organic compound having reactivity, and the organic compound having reactivity is one or more selected from the group consisting of an epoxy resin, a resol-type phenolic resin and a novolac-type phenolic resin. For example, when a novolac-type phenolic resin is used as the thermosetting resin to form a novolac-type phenolic resin composition having rubbery polymer particles dispersed therein, the water content is less. Therefore, the composition forms a curing agent having excellent strength-improving effect of an epoxy resin in electronic material applications.

The preferred embodiment is that an epoxy resin is used as the thermosetting resin to form an epoxy resin composition having rubbery polymer particles dispersed therein, having the water concentration of 1% by weight or less. The composition forms a cured product having excellent anticorrosive properties when applied to applications contacting with a metal, and a cured product having excellent electrical insulating properties when applied to electronic material applications.

The preferred embodiment is that a resol-type phenolic resin is used as the thermosetting resin to form a resol-type phenolic resin composition having rubbery polymer particles dispersed therein, having the water concentration of 1.2% to 3.0% by weight. Even in the case of carrying out concentration in a process for production of the thermosetting resin composition having rubbery polymer particles dispersed therein of the present invention described hereinafter while heating, the concentration can be conducted while maintaining high quality of a self-curable resol-type phenolic resin, and as a result, a high quality resol-type phenolic resin composition having rubbery polymer particles dispersed therein is obtained. Furthermore, in the case of applying the resol-type phenolic resin composition having rubbery polymer particles dispersed therein to flame-retardant composite material applications, a cured product having sufficiently suppressed generation of holes due to residual water can be obtained as flame-retardant composite material applications.

The thermosetting resin composition having rubbery polymer particles dispersed therein of the present invention can be produced by a process for production of a thermosetting resin composition having rubbery polymer particles dispersed therein comprising a concentration step of deaerating a gas phase adjacent to a mixed solution comprising the rubbery polymer particles, the thermosetting resin, water and an organic solvent to reduce pressure, thereby reducing the amounts of the water and the organic solvent in the mixed solution.

The preferred embodiment is the process for production of a thermosetting resin composition having rubbery polymer particles dispersed therein, further comprising a dilution step of adding a ketone-based organic solvent to the mixed solution to form a diluted mixed solution, before the concentration step.

The preferred embodiment is the process for production of a thermosetting resin composition having rubbery polymer particles dispersed therein, wherein dilution/concentration steps comprising the dilution step and the subsequent concentration step are conducted 2 times or more.

The preferred embodiment is the process for production of a thermosetting resin composition having rubbery polymer particles dispersed therein, wherein the water concentration of the mixed solution is 10% by weight or less, and the molar composition ratio of water in the gas phase is higher than the molar composition ratio of water in the solvent component in the mixed solution.

The preferred embodiment is that methyl ethyl ketone and/or methyl isobutyl ketone are used as the ketone-based organic solvent.

The preferred embodiment is the process for production of a thermosetting resin composition having rubbery polymer particles dispersed therein, comprising a purification step of the rubbery polymer particles which comprises mixing an aqueous latex comprising the rubbery polymer particles with an organic solvent having partial solubility to water to conduct demulsification, and then adding water to the demulsified mixed solution, thereby forming slurry containing aggregates of the rubbery polymer particles.

Effect of the Invention

The process according to the present invention makes it possible to stabilize the rubbery polymer particles and to efficiently reduce water, without generating scales in reducing water concentration in a mixture of a solvent having graft-polymerized rubbery polymer particles dispersed therein and a thermosetting resin solution.

The thermosetting resin composition having rubbery polymer particles dispersed therein of the present invention is obtained by the process of the present invention, in which despite that the solid content concentration is high concentration of 60% to 90% by weight, fluidity is excellent, so that the composition is easy to cure and mold; because the rubbery polymer particles are dispersed in the form of a primary particle, the composition has excellent strength-improving effect and excellent rigidity; and because the water concentration is 3% by weight or less, a high quality cured product is obtained by curing the composition.

BEST MODE FOR CARRYING OUT THE INVENTION

The present invention relates to a method for production of a thermosetting resin composition having rubbery polymer particles monodispersed therein, and to a method of stabilizing the rubbery polymer particles and efficiently reducing water, without generating scales by adding a ketone-based organic solvent, followed by concentration, in process of mixing a solvent having graft-polymerized rubbery polymer particles dispersed therein and a thermosetting resin solution, followed by condensation.

(Water Concentration)

The water concentration of the thermosetting resin composition having rubbery polymer particles dispersed therein of the present invention obtained by the process of production of the thermosetting resin composition having rubbery polymer particles dispersed therein of the present invention is 3% by weight or less, more preferably 1.0% by weight or less, further preferably 0.5% by weight or less, and particularly preferably 0.3% by weight or less, for the reason that large residual amount of water possibly induces poor curing. To further reduce the residual amount of water, it is preferred that dilution/concentration steps described hereinafter are conducted two times or more.

(Thermosetting Resin)

The thermosetting resin according to the present invention comprises an organic compound having reactivity, and due to the reactivity, is a resin curable with heat, light or a curing catalyst. Examples of the thermosetting resin include phenolic resins, epoxy resins, monofunctional or polyfunctional carboxylic acids and anhydrides thereof, amine compounds, maleimide compounds, vinyl compounds, allyl compounds, oxetane compounds, hydroxyl-containing compounds, and other reactive organic compounds. However, the thermosetting resin is not limited to those compounds. Of those compounds, epoxy resins and phenolic resins are preferred. Resol-type phenolic resin and novolac-type phenolic resin are preferred as the phenolic resin.

(Kind of Epoxy Resin)

Examples of the epoxy resin that can be used as a raw material in the present invention preferably include bisphenol A type epoxy resin, bisphenol F type epoxy resin, biphenyl type epoxy resin, polyfunctional epoxy resin having aromatic glycidylamine structure, dicyclopentadiene-type epoxy resin, epoxydized cresol novolac resin, epoxydized phenol novolac resin, urethane-modified or polyether-modified flexible epoxy resin, brominated epoxy resin and glycidyl ester-type epoxy resin and the like. However, the epoxy resin is not limited to those resins. Those resins may be used alone or as mixtures of two or more thereof. The form of the epoxy resin may be a solid, a solvent-diluted resin, a liquid and the like, and is not particularly limited.

(Kind of Phenolic Resin)

Examples of the phenolic resin that can be used as a raw material in the present invention preferably include novolac-type phenolic resins obtained by heating and (co)condensing phenols and/or naphthols, such as phenol, cresol, bisphenol A, bisphenol F, catechol and resorcinol, and a compound having an aldehyde group, such as formaldehyde, in the presence of an acidic catalyst having toluenesulfonic acid, oxalic acid, hydrochloric acid, sulfuric acid and the like added thereto, and resol-type phenolic resins and the like obtained by (co)condensing the phenols and/or naphthols and the compound having an aldehyde group in the presence of an alkaline catalyst. However, the phenolic resin is not limited to those resins. Those resins may be used alone or as mixtures of two or more thereof. The form of the phenolic resin may be a solid, a solvent-diluted resin, a liquid and the like, and is not particularly limited.

(Kind of Rubber)

The rubbery polymer particle that can be used in the present invention is not particularly limited. A so-called core-shell polymer comprising a rubber particle having the surface partially or entirely covered with a graft component, obtained by graft-polymerizing one or more vinyl-polymerizable monomer in the presence of rubber particles formed from a polymer comprising an elastomer or a rubbery polymer as the main component can uniformly be dispersed in the epoxy resin composition, and is therefore preferably used.

(Rubbery Polymer Particle)

The rubbery polymer particle is not particularly limited. However, in terms of the combination between easy designing as a rubber and easy production of a resin composition in the production process of the present invention, a polymer having a multilayer structure of two layers or more is preferred, and a polymer called a core-shell type polymer is particularly preferred. The core-shell type polymer is a polymer constituted of a rubber particle core formed from a polymer comprising an elastomer or a rubbery polymer as the main component, and a shell layer formed from a polymer component graft-polymerized with the core. The shell layer is characterized by graft-polymerizing a monomer constituting a graft component onto the core, thereby covering a part or the whole of the surface of the rubber particle core.

(Rubbery Particle Core)

The polymer constituting the rubber particle core is crosslinked, and can swell in an appropriate solvent. However, the polymer that does not substantially dissolve in a solvent is preferred. It is preferred that the rubber particle core is insoluble in an epoxy resin in the case that the rubber particle core is intended to disperse in the epoxy resin. The gel content of the rubber particle core is 60% by weight or more, more preferably 80% by weight or more, particularly preferably 90% by weight or more, and most preferably 95% by weight or more, based on the weight of the rubber particle core. On the other hand, the glass transition temperature (Tg) of the polymer constituting the rubber particle core is 0° C. or lower, and preferably −10° C. or lower, for the reasons that the polymer can easily be produced by the conventional polymerization methods such as emulsion polymerization and the like, and the polymer has good properties as a rubber.

The polymer constituting the rubber particle core preferably used is a rubber elastomer comprising 50% to 100% by weight of at least one monomer or more selected from a diene-based monomer (conjugated diene-based monomer) and a (meth)acrylic acid ester-based monomer, and 0% to 50% by weight of other copolymerizable vinyl monomer, a polysiloxane rubber-based elastomer, or a mixture of those from that the polymer can be available inexpensively and the polymer obtained has excellent properties as a rubber. The term "(meth)acryl" used herein means acryl and/or methacryl.

The diene-based monomer (conjugated diene-based monomer) constituting the rubber elastomer is not particularly limited, and examples thereof include butadiene, isoprene and chloroprene. Above all, butadiene is particularly preferred from that the polymer obtained has excellent properties as a rubber. The (meth)acrylic acid ester-based monomer is not particularly limited, and examples thereof include butyl acrylate, 2-ethylhexyl acrylate and lauryl methacrylate. Butyl acrylate or 2-ethylhexyl acrylate is particularly preferred from that the polymer obtained has excellent properties as a rubber. Those can be used alone or as mixtures of two or more thereof.

The rubber elastomer may be a copolymer of the diene-based monomer or the (meth)acrylic acid ester-based monomer, and a vinyl monomer copolymerizable therewith. Examples of the vinyl monomer copolymerizable with the diene-based monomer or the (meth)acrylic acid ester-based monomer include an aromatic vinyl-based monomer and vinyl cyanide-based monomer. Examples of the aromatic vinyl-based monomer that can be used include styrene, α-methylstyrene and vinylnaphthalene, and examples of the vinyl cyanide-based monomer that can be used include (meth)acrylonitrile and substituted acrylonitrile. Those can be used alone or as mixtures of two or more thereof.

The amount of the diene-based monomer or (meth)acrylic acid ester-based monomer used is preferably 50% by weight or more, and more preferably 60% by weight or more, based on the weight of the whole rubber elastomer. Where the amount of the diene-based monomer or (meth)acrylic acid ester-based monomer used to the whole rubber elastomer is less than 50% by weight, ability of imparting toughness to a cured product of a polymerizable organic compound (H) having a reactive group, such as an epoxy resin, may deteriorate. On the other hand, the amount of the monomer copolymerizable with those used is preferably 50% by weight or less, and more preferably 40% by weight or less, based on the weight of the whole rubber elastomer.

A polyfunctional monomer may be contained as a component constituting the rubber elastomer to control the degree of crosslinking. Examples of the polyfunctional monomer include divinylbenzene, butanediol di (meth)acrylate, triallyl (iso)cyanurate, allyl (meth)acrylate, diallyl itanonate and diallyl phthalate. The amount of those used is 10% by weight or less, preferably 5% by weight or less, and further preferably 3% by weight or less, based on the total weight of the rubber elastomer. Where the amount of those used exceeds 10% by weight, ability of imparting toughness to a cured product of a polymerizable organic compound having a reactive group, possessed by the rubber particle core tends to deteriorate.

To control the molecular weight and the degree of crosslinking of the polymer constituting the rubber elastomer, a chain transfer agent may be used, if necessary. The chain transfer agent includes alkyl mercaptans having 5 to 20 carbon atoms and the like. The amount of those compounds used is 5% by weight or less, and preferably 3% by weight or less, based on the total weight of the rubber elastomer. Where the amount of the chain transfer agent used exceeds 5% by weight, the amount of an uncrosslinked component of the rubber particle core is increased. As a result, for example, in the case of preparing an epoxy resin composition, the increased amount tends to adversely affect heat resistance, rigidity and the like of the composition.

A polysiloxane rubber-based elastomer can be used as the rubber particle core in place of the rubber elastomer or in combination with the rubber elastomer. In the case of using the polysiloxane rubber-based elastomer as the rubber particle core, a poltsiloxane rubber constituted of alkyl- or aryl-2-substituted silyloxy unit such as dimethylsilyloxy, methylphenylsilyloxy or diphenylsilyloxy can be used. In the case of using the polysiloxane rubber, it is more preferred that a polyfunctional alkoxysilane compound is partially used together at the time of polymerization, or a silane compound having a vinyl reactive group is subjected to a radical reaction or the like, thereby previously introducing a crosslinked structure, if necessary.

(Shell Layer)

The shell layer can impart affinity with the polymerizable organic compound having a reactive group, for that the rubbery polymer particles are stably dispersed in the polymerizable organic compound having a reactive group in the form of a primary particle.

It is preferred that the polymer constituting the shell layer is graft-polymerized onto the polymer constituting the rubber particle core, and is substantially bonded to the polymer constituting the core part. It is desired that 70% by weight or more, more preferably 80% by weight or more, and further preferably 90% by weight or more, of the polymer constituting the shell layer is bonded to the core part from that the resin composition is easily produced in the production process of the present invention.

It is preferred that the shell layer has swellability, compatibility or affinity to an organic solvent described hereinafter and the polymerizable organic compound having a reactive group from that the rubbery polymer particles are easily mixed with and dispersed in the polymerizable organic compound having a reactive group. Furthermore, it is preferred that the shell layer has reactivity with the polymerizable organic compound having a reactive group or curing agent compounded at the time of use, and has the function capable of chemically reacting with the polymerizable organic compound having a reactive group and the curing agent to form bonds under the condition that the polymerizable organic compound having a reactive group is reacted with the curing agent to cure the compound, if needed at the time of use.

It is preferred that the polymer constituting the shell layer is a polymer or a copolymer, obtained by polymerizing or copolymerizing one or more component selected from (meth) acrylic acid esters, aromatic vinyl compounds, vinyl cyanide compounds, unsaturated acid derivatives, (meth)acrylamide derivatives and maleimide derivatives. Particularly, in the case of requiring chemical reactivity in the shell layer when curing an epoxy resin, it is preferred that a copolymer obtained by copolymerizing one or more monomer containing a functional group having reactivity with the polymerizable organic compound (H) having a reactive group described hereinafter, curing agent thereof or curing catalyst thereof, the functional group being one or more selected from epoxy group, carboxyl group, hydroxyl group, carbon-carbon double bond, amino group and amide group and the like, in addition to (meth)acrylic acid alkyl esters, aromatic vinyl compounds or vinyl cyanide compounds and the like is used. It is more preferred that the functional group is at least one reactive functional group selected from the group consisting of epoxy group, carboxyl group, hydroxyl group and carbon-carbon double bond.

The (meth)acrylic acid ester includes (meth)acrylic acid alkyl esters such as methyl (meth)acrylate, ethyl (meth)acrylate, butyl (meth)acrylate and 2-ethylhexyl (meth)acrylate. The aromatic vinyl compound includes styrene, α-methylstyrene, alkyl-substituted styrenes, and halogen-substituted styrenes such as bromostyrene and chlorostyrene. The vinyl cyanide compound includes (meth)acrylonitrile and substituted acrylonitrile. The monomer containing a functional group having reactivity includes (meth)acrylic acid esters having a reactive side chain, such as 2-hydroxyethyl (meth) acrylate, 2-aminoethyl (meth)acrylate and glycidyl (meth) acrylate. The vinyl ester containing a reactive group includes glycidyl vinyl ether and allyl vinyl ether and the like. The unsaturated carboxylic acid derivatives include (meth)acrylic acid, itaconic acid, crotonic acid and maleic anhydride and the like. The (meth)acrylamide derivatives include (meth) acrylamide (including N-substitute) and the like. The maleimide derivatives include maleic imide (including N-substitute).

The rubber particle core/shell layer ratio (weight ratio) of the rubbery polymer particle is a range of preferably 40/60 to 95/5, more preferably 50/50 to 95/5, and further preferably 60/40 to 85/15. Where the ratio deviates from 40/60 and the ratio of the rubber particle core is decreased, the effect of improving toughness to the polymerizable organic compound having a reactive group tends to deteriorate. Reversely, where the ratio deviates from 95/5 and the ratio of the shell layer is decreased, coagulation is liable to be induced at the time of handling in the present production process, and the problem arises in easy operability. Additionally, properties expected may not possibly be exhibited.

(Production Process of Rubbery Polymer Particle)

The rubbery polymer particle can be produced by the conventional methods such as emulsion polymerization, suspension polymerization or microsuspension polymerization. Of those, the production process by emulsion polymerization is particularly preferred from that composition designing of the rubbery polymer particle is easy, industrial production is easy and latex of the rubbery polymer particles preferred in the present production process is easily obtained. It is preferred to use compounds that do not impair emulsification stability or dispersion stability even in the case that pH of aqueous latex is neutral, as an emulsifier or a dispersant in an aqueous medium. Specific examples of the emulsifier or the dispersant include alkali metal salts or ammonium salts of various acids such as alkyl or aryl sulfonic acids represented by dioctylsulfosuccinic acid and dodecylbenzenesulfonic acid, alkyl or aryl ether sulfonic acids, alkyl or aryl sulfuric acids represented by dodecylsulfuric acid, alkyl or aryl ether sulfuric acids, alkyl- or aryl-substituted phosphoric acids, alkyl or aryl ether-substituted phosphoric acids, N-alkyl or N-aryl sarcosinic acids represented by dodecylsarcosinic acid, alkyl or aryl carboxylic acids represented by oleic acid and stearic acid, and alkyl or aryl ether carboxylic acids; nonionic emulsifiers or dispersants such as alkyl- or aryl-substituted polyethylene glycol; and dispersants such as polyvinyl alcohol, alkyl-substituted cellulose, polyvinyl pyrrolidone and polyacrylic acid derivatives. Those can be used alone or as mixtures of two or more thereof.

In the gist of the invention, it is preferred that the emulsifier or the dispersant is used in an amount as less as possible within a range that does not disturb emulsification and dispersion stabilities in the latex preparation process of the rubbery polymer particle. Alternatively, it is more preferred that the emulsifier or the dispersant has properties to be extracted and cleaned in an aqueous phase up to the residual amount of the extent that does not affect properties of the resin composition produced by the present production process.

The particle diameter of the rubbery polymer particle that can be used in the production process of the present invention is not particularly limited, and any rubbery polymer particle can be used without problem so long as the rubbery polymer particle can stably be obtained in the form of aqueous latex. From the industrial productivity, the rubbery polymer particle having a volume average particle diameter of 0.03 μm to 2 μm is more preferred from that the production is easy.

(Production Process of Rubber)

The rubbery polymer particle can be produced by the conventional methods such as emulsion polymerization, suspension polymerization, microsuspension polymerization and solution polymerization. Above all, as the production of a core-shell polymer, emulsion polymerization is industrially most popular, and is preferred in excellent controllability of particle diameter.

In the emulsion polymerization, an emulsion polymerization-derived anionic surfactant is generally contained. As the emulsifier, it is preferred to use ABS (side chain type alkyl benzene sulfonate), LAS (linear alkyl benzene sulfonate), AOS (α-olefin sulfonate), AS (alkyl sulfuric acid ester salt), AES (alkyl ether sulfuric acid ester salt) and the like alone or as mixtures thereof.

(Aggregation Method of Rubber)

The rubbery polymer particle obtained by the production process is obtained as aqueous latex in many cases. For example, by a process (water aggregation method) of obtaining slurry of aggregates of the rubbery polymer particles by mixing an organic solvent having partial solubility to water with aqueous latex to demulsify the rubbery polymer particles, and then adding water to a mixed solution of the organic solvent and the latex, it is preferred to use the rubbery polymer particle once aggregated, as a raw material. The reason for this is that by using the rubbery polymer particles through a purification step as above, an epoxy resin composition having rubbery polymer particles dispersed therein, having less impurities and capable of using in electronic instrument applications can be produced.

(Filtration Method of Rubber Aggregate)

A method of solid-liquid separating the slurry of the rubbery polymer particles is not particularly limited. Examples of the method include precipitation filtration using a perforated board, a metal mesh or a filtering cloth, and vacuum filtration. It is preferred that the solid content concentration of cake remaining on a sieve by filtration is 25% by weight or more. Where the solid content concentration of the cake is less than 25% by weight, the amount of the water and the organic solvent in the aggregate is large. As a result, filtration efficiency is not sufficient, and load of a dehydration step conducted later is increased.

(Redispersion Method of Rubber Aggregate)

By adding an organic solvent to the aggregate of the rubbery polymer particles, followed by stirring, the rubbery polymer particles can be monodispersed in the form of a primary particle. In view of high dispersibility of the aggregate of the rubbery polymer particles, ketone-based organic solvents such as acetone, methyl ethyl ketone and methyl isobutyl ketone are preferred as the organic solvent.

(Mixing Method of Rubber and Thermosetting Resin Composition)

The solution having the rubbery polymer particles dispersed therein and the thermosetting resin composition are mixed. For example, in the case that the form of the thermosetting resin composition is solid and it is difficult to mix the composition with the solution having the rubbery polymer particles dispersed therein, it is preferred that the thermosetting resin composition is diluted with a solvent in order to facilitate the mixing. When the resin is an epoxy resin easily soluble in the solution having the rubbery polymer particles dispersed therein, the epoxy resin can directly be added in the form of a solid.

(Thermosetting Resin Composition Having Rubbery Polymer Particles Dispersed Therein)

The thermosetting resin composition having rubbery polymer particles dispersed therein of the present invention comprises 100 parts by weight of a thermosetting resin composition, and 1 to 80 parts by weight of rubbery polymer particles, the rubbery polymer particles being dispersed in the form of a primary particle, wherein the solid content concentration of the composition is 60% to 90% by weight, and the water concentration thereof is 3% by weight or less.

That is, in the thermosetting resin composition having rubbery polymer particles dispersed therein of the present invention, the amount of the rubbery polymer particles compounded is 1 to 80 parts by weight per 100 parts by weight of the thermosetting resin. Where the amount is 1 part by weight or less, modification effect of toughness and the like is difficult to be exhibited, and where the amount is 80 parts by weight or more, fixation of the rubbery polymer particles with each other is liable to cause in the concentration operation of the present invention, scale is generated, and the rubbery polymer particles cannot be maintained in the uniformly dispersed state. Additionally, in the concentration operation, membrane is formed on the liquid level, resulting in slow evaporation rate.

The thermosetting resin composition having rubbery polymer particles dispersed therein of the present invention is preferably that the particle diameter of the rubbery polymer particle is 10 nm to 500 nm in terms of an average particle diameter, and its uniformity is high, in order to impart excellent effect of improving strength and excellent uniformity. To achieve this, it is preferred that the rubbery polymer particles are prepared by aqueous emulsion polymerization, and it is required that the rubbery polymer particles are dispersed in the form of a primary particle. To achieve the monodispersion, it is preferred that the rubbery polymer particles are produced through a water aggregation process described hereinafter. As a result of those, the resin composition is liable to contain water.

On the other hand, in the thermosetting resin composition having rubbery polymer particles dispersed therein of the present invention, the solid content concentration is required to be 60% to 90% by weight, and preferably 60% to 80% by weight. Where the solid content concentration is 60% by weight or less, the amount of a volatile solvent is large and the residual solvent in the cured product is increased. Where the solid content concentration is 90% by weight or more, the composition has high viscosity, and it is difficult to handle the composition.

A cured product having suppressed decrease in quality originally possessed by the thermosetting resin can be obtained by forming the thermosetting resin composition having rubbery polymer particles dispersed therein of the present invention wherein the water concentration is 3% by weight or less from a water-containing high viscosity thermosetting resin composition having rubbery polymer particles dispersed therein.

(Concentration Step)

It is preferred to conduct a concentration step that conducts concentration under reduced pressure by heating while mixing a mixed solution of a solution having the rubbery polymer particles dispersed therein and the thermosetting resin composition. The concentration operation under reduced pressure is preferably conducted with a vacuum evaporator or a reduced pressure vessel. From dehydration efficiency, the preferred operation condition ranges are that the pressure is 100 torr to 700 torr, and the temperature is 40° C. to 100° C. The particularly preferred operation condition ranges are that the pressure is 400 torr to 600 torr, and the temperature is 50° C. to 80° C. It is preferred that the solid content concentration of the mixed solution is a range of 50% to 80% by weight, which is a concentration range at which the epoxy resin dissolved does not precipitate, and which is a concentration that can ensure fluidity of the mixed solution. In the case of converting the mixed solution obtained at this stage into the epoxy resin composition having rubbery polymer particles dispersed therein of the present invention, the solid content concentration thereof is required to be 60% to 90% by weight, and preferably 60% to 80% by weight, such that the rubbery polymer particles dissolved over a long period of time do not aggregate and precipitate and in order to ensure fluidity as a product.

In most cases, the amount of water is not extremely decreased by one time concentration under reduced pressure, and is 1% to 10% by weight. Particularly, in the case of containing an organic solvent being difficult to form an azeotrope with water and having low boiling point in the mixed solution, water does not evaporate at all, and the concentration of water in the mixed solution is difficult to be decreased. The organic solvent includes acetone.

(Dilution Step, and Dilution/Concentration Steps)

It is preferred to conduct the dilution step that an organic solvent is added to the mixed solution concentrated under reduced pressure as above to dilute the mixed solution. The organic solvent is preferably an organic solvent that does not aggregate the rubbery polymer particles and is liable to form an azeotrope with water. Preferred examples of the organic solvent include methyl ethyl ketone, methyl isobutyl ketone, diethyl ketone, dipropyl ketone, ethyl butyl ketone, ethyl acetate, vinyl acetate, methyl acetate and butyl acetate. Of those, further preferred organic solvent is methyl ethyl ketone and methyl isobutyl ketone. Those do not generate scales, and can stably maintain the rubbery polymer particles. Particularly preferred organic solvent is methyl ethyl ketone for the reason that its azeotropic temperature is lower than that of other ketone-based solvents. The concentration after dilution is preferably 10% to 40% by weight. To dilute the mixed solution to a concentration of 10% by weight or less, a tank having very large volume is necessary, the amount of the resin composition obtained is decreased, and utilization efficiency of the tank is decreased. Where the concentration is 40% by weight or more, the range that can be concentrated is narrowed, the number of operation is increased, and the operation is complicated, which are inefficient.

By again conducting the concentration step to the diluted mixed solution in the same manner as above (concentration step), the process for production of the thermosetting resin composition having rubbery polymer particles dispersed therein of the present invention is achieved, and furthermore, the thermosetting resin composition having rubbery polymer particles dispersed therein of the present invention can be obtained. In the concentration step under reduced pressure at the second time or later, from the standpoint of dehydration efficiency, the preferred operation condition ranges are that the pressure is 100 torr to 700 torr as same as the previous operation, and the temperature is slightly higher than the temperature of the previous operation. For example, the temperature is preferably 40° C. to 100° C. The final solid content concentration of the mixed solution is a concentration range that the thermosetting resin dissolved does not precipitate. The concentration is preferably 60% to 90% by weight, and further preferably 60% to 80% by weight, which is the concentration capable of ensuring fluidity of the mixed solution.

(Separation of Water from Solvent)

The organic solvent distilled in the concentration operation is treated with a dehydrating agent, a pervaporation method, distillation or the like to remove water, and then can be recycled. Alternatively, vapor vaporized in the concentration operation is continuously dehydrated using a gas separation membrane such as a polyimide membrane to obtain the vapor as dehydrated organic solvent vapor, and the vapor is cooled to condense. The condensate can be recycled.

EXAMPLES

The present invention is described specifically by the Examples, but the invention is not limited to those Examples.

Prior to the description of the Examples, analytical measurement methods used in the Examples and the Comparative Examples are described below.

(Measurement Method of Amount of Water in Solution)

Karl Fischer MKC-510N, available from Kyoto Electronics Manufacturing Co., Ltd., was used for the measurement of the amount of water in the thermosetting resin solution containing rubbery polymer particles.

(Measurement Method of Solid Content Concentration in Solution)

A given amount of the thermosetting resin solution containing rubbery polymer particles was sampled, and dried at 170° C. for 20 minutes using a hot drier. The solid content concentration in the solution was calculated from the change in weight before and after drying.

(Measurement Method of Average Particle Diameter of Rubbery Polymer Particle in Solution)

A volume average particle diameter of the rubbery polymer particle was measured in the form of latex. The volume average particle diameter (μm) was measured by a light scattering method using MICROTRAC UPA, available from LEED & NORTHRUP INSTRUMENTS, as a measuring apparatus.

Preparation method of solutions having rubbery polymer particles dispersed therein used in the Examples and the Comparative Examples is described below.

(Production Example 1 of Rubbery Polymer Particle Latex: MBS-Based)

200 parts of water, 0.03 part of tricalcium phosphate, 0.25 part of potassium dihydrogen phosphate, 0.002 part of ethylenediamine tetraacetic acid, 0.001 part of ferrous sulfate and 1.5 parts of sodium dodecylbenzene sulfonate were introduced into a 100 liter pressure-resistant polymerizer, and nitrogen substitution was sufficiently conducted while stirring to remove oxygen. 75 parts of butadiene and 25 parts of styrene were introduced into the system, and the temperature was elevated to 45° C.

0.015 part of paramenthane hydroperoxide and subsequently 0.04 part of sodium formaldehyde sulfoxylate were introduced into the system to initiate polymerization. Four hours later from the initiation of polymerization, 0.01 part of paramenthane hydroperoxide, 0.0015 part of ethylenediamine tetraacetic acid and 0.001 part of ferrous sulfate were introduced. Ten hours later from the initiation of polymerization, residual monomers were removed by deaeration under reduced pressure, and the polymerization was completed. Thus, rubber latex containing rubbery polymer particles obtained by copolymerizing 75% by weight of butadiene and 25% by weight of styrene was prepared.

440 g of pure water and 1,300 g of the rubber latex obtained were charged in a 3 liter glass container, followed by stirring at 70° C. while conducting nitrogen substitution. The rubber latex (1,300 g) contained 420 g of the rubbery polymer particles having an average particle diameter of 100 nm, and sodium dodecylbenzene sulfonate added as an emulsifier at the time of the copolymerization in an amount of 1.5% by weight based on the weight of the solid content of the rubber latex.

Finally, 1.2 g of azobisisobutyronitrile (AIBN) as a polymerization initiator was added to the rubber latex, and the following mixture as graft copolymer components was further added thereto over 3 hours.

Styrene: 54 g
Methyl methacrylate: 72 g
Acrylonitrile: 36 g
Glycidyl methacrylate: 18 g After completion of the addition of the mixture, stirring was further conducted for 2 hours, and the reaction was completed. Thus, aqueous latex containing graft-polymerized MBS-based rubbery polymer particles was obtained.

(Production Example 2 of Rubbery Polymer Particle Latex: Acrylic Rubber-based)

1,800 g of deionized water, 0.02 g of disodium ethylenediamine tetraacetate (EDTA), 0.01 g of ferrous sulfate·7 hydrated salt, 0.4 g of sodium formaldehyde sulfoxylate (SFS) and 5 g of sodium dodecylbenzene sulfonate (SDS) were introduced into a glass reactor equipped with a thermometer, a stirrer, a reflux cooler, a nitrogen inlet, and an apparatus of adding monomers and an emulsifier, and the temperature was elevated to 50° C. while stirring in nitrogen stream.

A mixture of 780 g of butyl acrylate (BA), 20 g of allyl methacrylate (ALMA) and 0.2 g of cumene hydroperoxide (CHP) was continuously added dropwise to the glass reactor over 5 hours. Together with the addition of the mixture, an aqueous solution of 10 g of SDS in a concentration of 5% by weight was continuously added over 5 hours. Stirring was continued for 1 hour after completion of the addition of the mixture to complete the polymerization, thereby obtaining aqueous latex containing an elastic core layer of the polymer fine particles. The volume average particle diameter of the elastic core layer of the polymer fine particles contained in the aqueous latex obtained was 110 nm.

Subsequently, a mixture of 130 g of BA, 60 g of glycidyl methacrylate (GMA), 10 g of ALMA and 0.1 g of CHP was continuously added to the glass reactor over 90 minutes. After completion of the addition, 0.01 parts by mass of CHP was added, and stirring was further continued for 1 hour to complete the polymerization, thereby obtaining aqueous latex containing acrylic rubber-based rubbery polymer particles. The polymerization conversion ratio of the monomer components was 99.2%.

(Preparation of Solution Having MBS-based Rubbery Polymer Particles Dispersed Therein)

126 g of methyl ethyl ketone as an organic solvent having partial solubility in water at 25° C. was charged in a 1 liter tank equipped with a stirrer (inner diameter: 100 mm, four flat paddle blades, blade diameter: 75 mm, 3 steps in axial direction). 126 g of the aqueous latex containing the MBS-based rubbery polymer particles graft-polymerized and produced in Production Example 1 was introduced into the tank under stirring at 400 revolutions per minute, followed by uniformly mixing. While continuing the stirring at 400 revolutions per minute, 200 g (total amount) of water was added at a supply rate of 80 g per minute. After completion of the addition of water, stirring was immediately stopped. As a result, slurry liquid comprising aggregates and an aqueous phase comprising an organic solvent was obtained by demulsification. The slurry liquid was solid-liquid separated into the aqueous phase and the aggregates to recover 104 g of the aggregates.

150 g of methyl ethyl ketone was added to 104 g of the aggregates, and the resulting mixture was stirred for 30 minutes under the stirring condition of 500 revolutions per minute. Thus, a solution having the graft-polymerized MBS-based rubbery polymer particles uniformly dispersed therein was prepared. As a result of measuring an average particle diameter of the graft-polymerized rubbery polymer particles in the solution having the rubbery polymer particles dispersed therein, the average particle diameter was 120 nm, and it was confirmed that the rubbery polymer particles were monodispersed.

(Preparation of Solution Having Acrylic Rubber-based Rubbery Polymer Particles Dispersed Therein)

A solution having acrylic rubber-based rubbery polymer particles dispersed therein was prepared in the same manner as in the above (preparation of the solution containing MBS-based rubbery polymer particles dispersed therein), except that the aqueous latex used was changed from the MBS-based rubbery polymer particles produced in Production Example 1 to the acrylic rubber-based rubbery polymer particles produced in Production Example 2. Thus, a solution of the acrylic rubber-based rubbery polymer particles uniformly dispersed therein was prepared. As a result of measuring an average particle diameter of the graft-polymerized rubbery polymer particles in the solution having the rubbery polymer particles dispersed therein, the average particle diameter was 130 nm, and it was confirmed that the rubbery polymer particles were monodispersed.

Example 1

37 g of a solid epoxy resin (EPIKOAT 1001, available from JER) and 36 g of methyl ethyl ketone were poured into a 1 liter tank (inner diameter: 100 mm) equipped with a jacket, an exhaust outlet having a condenser arranged outside, and a stirrer (anchor blade having a blade shape of 90 mm), and the jacket temperature was set to 60° C. After the temperature in the tank was uniform, stirring was conducted by the stirrer to uniformly mix and completely dissolve the solid content. Thus, an epoxy resin solution was prepared.

Subsequently, 250 g of the solution having the MBS-based rubbery polymer particles dispersed therein was added to the tank containing the epoxy resin solution prepared therein to prepare a mixed solution A1 of the solution having rubbery polymer particles dispersed therein and the epoxy resin solution. The solid content concentration of the mixed solution A1 was 23% by weight, and the water concentration was 8% by weight.

The mixed solution A1 was stirred with the stirrer to uniformly mix the same. A vacuum pump (oil-sealed rotary vacuum pump, TSW-150, available from Sato Vac Inc.) was mounted on the exhaust outlet having the condenser arranged outside. Deaeration was conducted, and volatile components in the mixed solution A1 were distilled away to obtain a mixed solution A2 having the solid content concentration of 50% by weight and the water concentration of 3% by weight. Finally, 75 g of methyl ethyl ketone as a ketone-based organic solvent for dilution step was added to the tank, and the distillation was continued to obtain a mixed solution A3 having the solid content concentration of 65% by weight and the water concentration of 0.5% by weight as an epoxy resin composition.

Thus, the epoxy resin composition having less amount of water and containing the MBS-based rubbery polymer particles was obtained. As a result of observing the dispersed state of the rubbery polymer particles in the epoxy resin composition, the rubbery polymer particles in the solution having the rubbery polymer particles dispersed therein maintained the average particle diameter of 120 nm without aggregation, and were uniformly monodispersed.

25 g of the epoxy resin composition was mixed with 75 g of the same epoxy resin, and 13 g of diaminodiphenyl sulfone as a curing agent was mixed with the resulting mixture, followed by stirring. The resulting mixture was allowed to stand in a vacuum drier, and defoamed in a nitrogen atmosphere, and then under reduced pressure at 60° C. for 10 minutes. The mixture was poured in a mold having the dimension of 100×150×3 mm, and then held therein at 120° C. for 16 hours to cure. Thus, a cured product was obtained.

After a part of the molded article obtained was cut off, and the rubbery polymer particles were dyed with osmium oxide, a thin piece was cut off, and observed at a 40,000-hold magnification using a transmission electron microscope (JEM-1200EX, available from JEOL Ltd.). As a result of judging the dispersion state of the rubbery polymer particles in the epoxy resin cured product by the following standards using particle dispersion power (%) calculated by the following method as an index, the particle dispersion power was 98%, and it was judged to be good. The particle dispersion power is preferably 90% or more, more preferably 95% or more, and particularly preferably 98% or more.

(Calculation of Particle Dispersion Power)

In the TEM photograph obtained, four areas of 5 cm square were randomly selected. The total number $B_0$ of the rubbery polymer particles, and the number $B_1$ of the rubbery polymer particle contacting with 3 or more rubbery polymer particles (in the case that a certain one rubbery polymer particle is contacted with n rubbery polymer particles, the number is counted as n) are obtained, and the particle dispersion power is calculated by the following equation.

$$\text{Particle dispersion power (\%)} = (1-(B_1/B_0)) \times 100 \quad (1)$$

That is, when the measurement results of the average particle diameter of the rubbery polymer particles contained in the thermosetting resin composition having rubbery polymer particles dispersed therein are the same as the measurement results of the average particle diameter of the graft-polymerized rubbery polymer particles in the solution having the rubbery polymer particles dispersed therein, it is considered that the rubbery polymer particles in the cured molded article of the curable resin comprising the thermosetting resin composition having rubbery polymer particles dispersed therein maintain the same dispersion state, that is, monodispersion.

Example 2

In place of 37 g of the solid epoxy resin and 36 g of methyl ethyl ketone in Example 1, 150 g of a solution type epoxy resin (D.E.R. 530-A80, available from Dow Chemical Company) which is an acetone solution comprising a brominated epoxy resin as the main component was poured into the same type of a 1 liter tank as used in Example 1.

Subsequently, 250 g of the solution having the MBS-based rubbery polymer particles dispersed therein was added to the tank to prepare a mixed solution of B1 of the solution having the MBS-based rubbery polymer particles dispersed therein and the epoxy resin solution. The solid content concentration of the mixed solution B1 was 38% by weight, and the water concentration was 6.6% by weight.

The mixed solution B1 was stirred with a stirrer to uniformly mix the same. Volatile components in the mixed solution B1 were distilled away in the same method as in Example 1 to obtain a mixed solution B2 having the solid content concentration of 65% by weight and the water concentration of 4.2% by weight.

250 g of methyl ethyl ketone as a part of the ketone-based organic solvent for dilution step was added to the tank, and the distillation was continued to obtain a mixed solution B3 having the solid content concentration of 65% by weight and the water concentration of 1.0% by weight as an epoxy resin composition.

Finally, 250 g of methyl ethyl ketone as the remainder of the ketone-based organic solvent for dilution step was added to the tank, and the distillation was continued to obtain a mixed solution B4 having the solid content concentration of 75% by weight and the water concentration of 0.3% by weight as an epoxy resin composition having further reduced water content.

Thus, the epoxy resin composition having less amount of water and containing the MBS-based rubbery polymer particles was obtained. As a result of observing the dispersed state of the MBS-based rubbery polymer particles in the epoxy resin composition, the rubbery polymer particles in the solution having the rubbery polymer particles dispersed therein maintained the average particle diameter of 120 nm without aggregation, and were uniformly monodispersed.

Example 3

A mixed solution E1 of a solution having acrylic rubber-based rubbery polymer particles dispersed therein and the epoxy resin solution was prepared in the same manner as in Example 1, except for using the acrylic rubber-based rubbery polymer particles dispersed therein in place of the solution having the MBS-based rubbery polymer particles dispersed therein of Example 1. The solid content concentration of the mixed solution E1 was 23% by weight, and the water concentration was 7.8% by weight.

The mixed solution E1 was stirred with the stirrer to uniformly mix the same. A vacuum pump (oil-sealed rotary vacuum pump, TSW-150, available from Sato Vac Inc.) was mounted on the exhaust outlet having the condenser arranged outside. Deaeration was conducted, and volatile components in the mixed solution E1 were distilled away to obtain a mixed solution E2 having the solid content concentration of 50% by weight and the water concentration of 2.5% by weight. Finally, 75 g of methyl ethyl ketone as the ketone-based organic solvent for dilution step was added to the tank, and the distillation was continued to obtain a mixed solution E3 having the solid content concentration of 65% by weight and the water concentration of 0.4% by weight as an epoxy resin composition.

Thus, the epoxy resin composition having less amount of water and containing the acrylic rubber-based rubbery polymer particles was obtained. As a result of observing a dispersed state of the rubbery polymer particles in the epoxy resin composition, the rubbery polymer particles in the solution having the rubbery polymer particles dispersed therein maintained the average particle diameter of 130 nm without aggregation, and were uniformly monodispersed.

Comparative Example 1

The mixed solution A2 was prepared in the same manner as in Example 1, and subsequently, a mixed solution C3 was prepared by adding 75 g of toluene as the organic solvent for dilution step in place of 75 g of methyl ethyl ketone in Example 1. The mixed solution C3 was stirred with the stirrer to uniformly mix the same. As a result, at this stage, a part of the MBS-based rubbery polymer particles in the mixed solution C3 formed aggregates of 1 µm to 1 mm, and the average particle diameter of 120 nm which is the average particle diameter of the MBS-based rubbery polymer particles in the solution having the MBS-based rubbery polymer particles dispersed therein could not maintain.

Comparative Example 2

Similarly to Comparative Example 1, the mixed solution A2 was prepared in the same manner as in Example 1, and subsequently, a mixed solution D3 was prepared by adding 75 g of xylene as the organic solvent for dilution step in place of 75 g of methyl ethyl ketone in Example 1 or 75 g of toluene in Comparative Example 1. The mixed solution D3 was stirred with the stirrer to uniformly mix the same. As a result, at this stage, a part of the MBS-based rubbery polymer particles in the mixed solution D3 formed aggregates of 1 µm to 1 mm, and the average particle diameter of 120 nm which is the average particle diameter of the MBS-based rubbery polymer particles in the solution having rubbery polymer particles dispersed therein could not stably be maintained.

Comparative Example 3

The mixed solution A1 of the epoxy resin solution and the solution having the rubbery polymer particles dispersed therein was prepared in the same manner as in Example 1. The mixed solution A1 was stirred with the stirrer to uniformly mix the same.

300 g of the uniformly mixed solution A1 was sampled, and introduced into a PV separator apparatus equipped with a tank, a jacket, and an exhaust outlet having a condenser arranged outside, available from Mitsui Engineering & Shipbuilding Co., Ltd. The jacket temperature was set to 100° C.

A tube formed of a zeolite film was provided in the tank, and the pressure in the tube was reduced to 6 mmHg by a vacuum pump (oil-sealed rotary vacuum pump, TSW-150, available from Sato Vac Inc.) through the exhaust outlet having the condenser arranged outside, thereby conducting deaeration.

After the tank temperature was uniform, the inside of the tube was deaerated through the exhaust outlet having a condenser arranged outside to conduct dehydration operation to the mixed solution A1 sampled. The deaeration operation was continued for 40 hours to obtain a mixed solution E3 having the solid content concentration of 21% by weight and the water concentration of 0.5% by weight.

Comparative Example 4

300 g of a solution consisting of 10% of water and 90% of methyl ethyl ketone was introduced into the PV separator apparatus described in detail in Comparative Example 3, and the deaeration operation was carried out in the same manner as in Comparative Example 3. The deaeration operation was continued for 13 hours to obtain a methyl ethyl ketone solution having the water concentration of 0.5%.

From the comparison between Comparative Example 3 and Comparative Example 4, it was understood that in the deaeration operation of Comparative Example 3 which contains a resin, dehydration ability is decreased to ⅓ by clogging of pores due to adhesion of the resin to the surface of the zeolite film, as compared with the deaeration operation of Comparative Example 4 which does not contain a resin.

Example 4

A mixed solution F1 with a phenolic resin solution was prepared in the same manner as in Example 1, except for using a solution type resol-type phenolic resin which is a methyl ethyl ketone solution comprising a phenolic resin as the main component in place of the epoxy resin solution of Example 1. The solid content concentration of the mixed solution F1 was 33% by weight, and the water concentration was 6.1% by weight.

The mixed solution F1 was stirred with the stirrer to uniformly mix the same. A vacuum pump (oil-sealed rotary vacuum pump, TSW-150, available from Sato Vac Inc.) was mounted on the exhaust outlet having the condenser arranged outside. Deaeration was conducted, and volatile components in the mixed solution F1 were distilled away to obtain a mixed solution F2 having the solid content concentration of 70% by weight and the water concentration of 1.8% by weight.

80 g of methyl ethyl ketone as a ketone-based organic solvent for dilution step was added to the tank, and the distillation was continued to obtain a mixed solution F3 having the solid content concentration of 70% by weight and the water concentration of 0.6% by weight as a phenolic resin composition having the rubbery polymer particles dispersed therein.

Thus, the phenolic resin composition having less amount of water and containing the MBS-based rubbery polymer particles was obtained. As a result of observing the dispersed state of the MBS-based rubbery polymer particles in the phenolic resin composition, the rubbery polymer particles in the solution having the rubbery polymer particles dispersed therein maintained the average particle diameter of 120 nm without aggregation, and were uniformly monodispersed.

Furthermore, 80 g of methyl ethyl ketone as a ketone-based organic solvent for dilution step was added to the tank, and the distillation was continued to obtain a mixed solution F4 having the solid content concentration of 68% by weight and the water concentration of 0.3% by weight as a phenolic resin composition having further reduced water concentration. At the stage of reducing water from F2 to F3, generation of a phenolic resin cured product was slightly observed.

The invention claimed is:

1. A thermosetting resin composition having rubbery polymer particles dispersed therein, comprising 100 parts by weight of a resol-type phenolic resin, and 1 to 80 parts by weight of rubbery polymer particles,
   wherein the rubbery polymer particles are dispersed in the form of a primary particle, and
   the solid content concentration is 60% to 90% by weight, and the water concentration is 1.2% to 3.0% by weight.

2. The thermosetting resin composition having rubbery polymer particles dispersed therein according to claim 1, wherein the solid content concentration is 60% to 80% by weight.

3. The thermosetting resin composition having rubbery polymer particles dispersed therein according to claim 1, wherein the rubbery polymer particle has a core-shell structure comprising at least two layers of a inside rubber particle core, and an outermost shell layer, the inside rubber particle core comprises a rubbery polymer having a glass transition temperature of 0° C. or lower, and the outermost shell layer comprises a shell polymer having a reactive group.

4. The thermosetting resin composition having rubbery polymer particles dispersed therein according to claim 3, wherein the resol-type phenolic resin further comprises an organic compound having reactivity, and the organic compound having reactivity is a novolac-type phenolic resin.

5. A process for production of the thermosetting resin composition having rubbery polymer particles dispersed therein, comprising a dilution step of adding a ketone-based organic solvent to a mixed solution containing rubbery polymer particles, a thermosetting resin, water and an organic solvent, to form a diluted mixed solution, and a concentration step of reducing pressure of a gas phase adjacent to the mixed solution, thereby reducing the amounts of the water and the organic solvent in the mixed solution, wherein a combination of the dilution step and the subsequent concentration step is conducted 2 or more times.

6. The process for production of the thermosetting resin composition having rubbery polymer particles dispersed therein according to claim 5, wherein the ketone-based organic solvent is methyl ethyl ketone and/or methyl isobutyl ketone.

7. The process for production of the thermosetting resin composition having rubbery polymer particles dispersed therein according to claim 5, wherein the water concentration of the mixed solution is 10% by weight or less, and the molar composition ratio of water in the gas phase is higher than the molar composition ratio of water in the solvent component in the mixed solution.

8. The process for production of the thermosetting resin composition having rubbery polymer particles dispersed therein according to claim 5, further comprising a purification step which comprises mixing an aqueous latex comprising the rubbery polymer particles with an organic solvent having partial water-solubility to conduct demulsification, and then adding water to the demulsified mixed solution, thereby forming slurry containing aggregates of the rubbery polymer particles.

* * * * *